Patented Aug. 28, 1928.

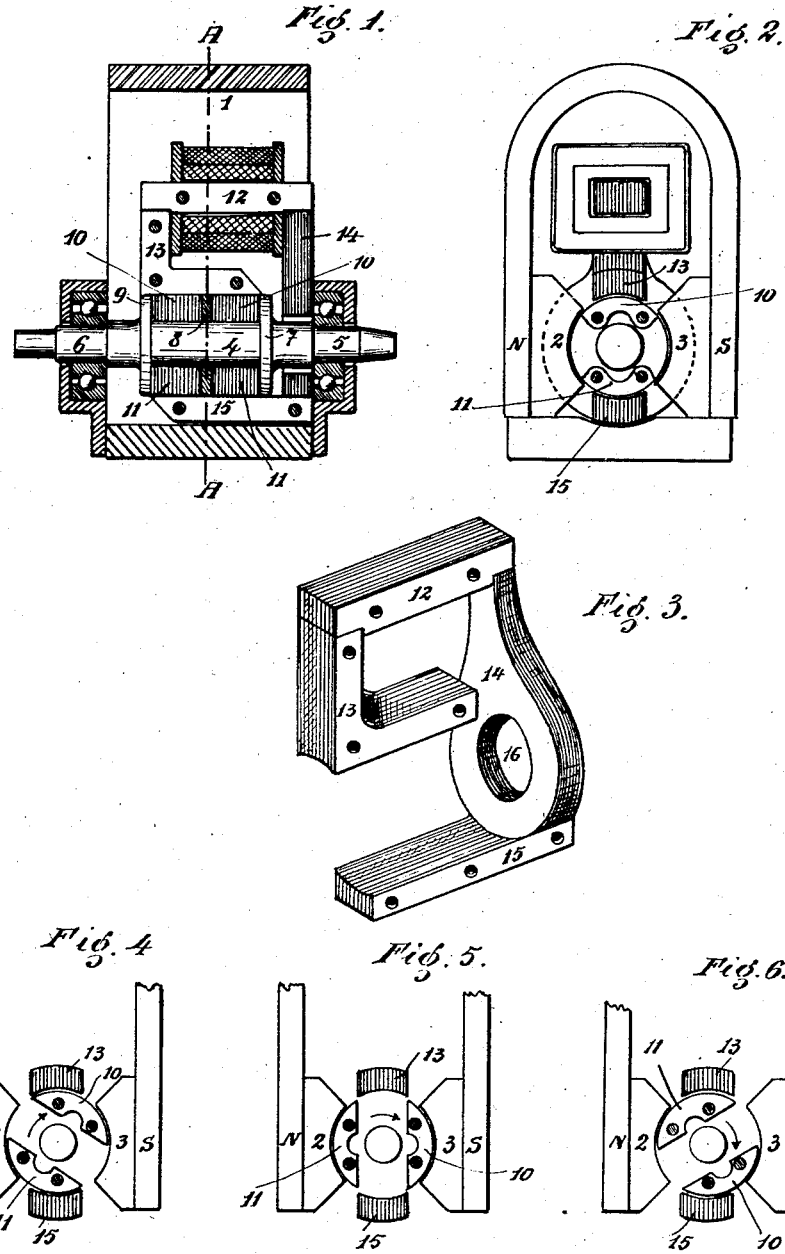

1,682,086

UNITED STATES PATENT OFFICE.

GINO MODIGLIANI, OF IVREA, ITALY, ASSIGNOR TO THE FIRM ING. C. OLIVETTI & C., OF IVREA, ITALY.

MAGNETO-ELECTRIC MACHINE.

Application filed June 1, 1927, Serial No. 195,755, and in Italy September 27, 1926.

The magneto-electric machine hereafter described and forming the object of the present invention, belongs to the class generally called "magnetos", generating electric currents which may be used for different objects, but mostly for producing sparks for the ignition in combustion engines.

The present machine belongs to the type in which the permanent magnets and the armature coils are fixed and the variations and reversals of the magnetic flux through the iron core of the armature windings are obtained by rotating parts of the magnetic material in such a way as to maintain the magnetic circuit permanently closed.

In the present invention, moreover, the revolving part is perfectly balanced and allows a light and substantial construction, thus permitting the very high rotational speeds now attained in modern combustion engines.

The rotating iron-core obtains in each revolution, four times the reversal of the direction of the magnetic-flux through the core of the armature, and consequenty four maximums in the electromotive force.

The particular characteristic feature of the machine is the special arrangement of the core of the armature and of its extensions or pole expansions. Such an arrangement allows a short magnetic circuit, and permits the armature core and windings to be placed inside the permanent magnets, thus reducing the overall dimensions of the machine and at the same time permitting an ample extension of the surfaces facing the air gap of the rotating and fixed magnetic cores, so that the closure of the magnetic circuit is very good, and stray-fluxes having pernicious effects on the efficiency of the machine and on the life of the permanent magnets are reduced to a minimum. The rotating parts and the core of the armature can, besides, be easily made out of assembled magnetic sheet-steel stampings electrically isolated one from another and consequently free from parasite currents dispersing energy in heat.

In the accompanying drawings, Fig. 1 is a section of the machine along its longitudinal axis: Fig. 2 is a cross-section on the line A—A of Fig. 1: Fig. 3 is a perspective view of the armature core. Figures 4, 5 and 6 are diagrammatic sections on the line A—A of Fig. 1 showing various positions of the rotating iron-core during an entire revolution.

The machine can be provided with one or more horse-shoe permanent magnets: the machine shown diagrammatically in the accompanying drawing has a single magnet 1 provided with two polar expansions 2 and 3, right and left, bored so as to form a cylindrical cavity in which revolves the rotating part.

In the inside of the magnet is placed the fixed armature core 12 which carries the armature-coil or coils and has secured thereto a pole member 13 and an extension 14 and pole member 15 on the extension. All these parts are placed in the vertical plane of the machine along the axis (i. e. in the plane of Fig. 1). The parts 13 and 15 developing parallel to the shaft of the machine, are turned on their inside faces to the same bore of the two polar expansions 2 and 3 and complete with the same the cylindrical cavity mentioned above. Extension 14 of the magnetic circuit is provided with a large hole (see Fig. 3) allowing the shaft of the machine to go therethrough.

This particular arrangement provides that the bearings of the shaft be placed laterally and on the outside of the group forming the magnetic part of the machine. In such a way the shaft can be extended on both sides of the engine, its bearings can be placed in a position easy to be reached and inspected and at one end of the shaft can be easily fixed the coupling flange and at the other can be arranged the parts controlling the circuit breaker and the current distributor which, as known, exist in all magneto-electric machines used for ignition in internal combustion motors.

All parts forming the armature just described are held together and to the base of the machine with proper connections and means, which for clearness-sake are not shown in the drawing. The rotating part which produces, with its motion, the variations and reversals of the magnetic flux across the armature, is formed by a shaft 4 of nonmagnetic material, carried by two bearings 5 and 6 on which, between proper flanges 7, 8 and 9, also of nonmagnetic material, are held two circular segments 10 and 11 of magnetic material, preferably laminated, which due to their relatively great length, are secured to the shaft by the intermediate nonmagnetic flange 8, as shown in Fig. 1. The latter has the sole object of strengthening the rotating part and preventing its swelling in the centre through centrifugal force.

As clearly shown, the magnetic laminations forming said cores are secured to the above named flanges by metallic rods placed through the laminæ and the discs or flanges.

Naturally such a way of building-up the rotating core can be replaced by any other obtaining the same result of giving a unit resisting distortion and centrifugal forces.

The above described arrangement of the magnetic parts obtains a very short magnetic circuit, while, owing to the length of the parts 13 and 15 of the fixed pole members of the armature, of the pole-expansions 2 and 3 of the permanent magnet and of the segments 10 and 11 of the rotating part, the surfaces of the fixed and moving magnetic parts facing each other through the air-gap, are very ample and thus stray-fluxes caused by said air-gap are reduced to a minimum.

As clearly shown in section Fig. 2 the circular segments 10 and 11 forming the rotating part of the core, cover an angle somewhat greater than the angle between the polar expansions 2 and 3 of the permanent magnet. This is necessary in order to always keep the magnetic circuit practically closed.

To understand the working of the machine reference is directed to Figs. 2, 4, 5 and 6.

In the latter the various parts are marked with the same numbers in all figures viz: 10 and 11 are the circular segments forming the rotating-core, 2 and 3 the polar expansions of the permanent magnet 1 and 13 and 15 the polar expansions of the armature-core.

Supposing that the N pole of the magnet be at the polar expansion 2, that the magnetic flux will be directed north-south, when the rotating core is in the position shown in Fig. 2, the magnetic flux passes directly from polar expansion 2 to 3 across the two cores 10 and 11. In such a position the magnetic flux does not go through armature core 12 (Figs. 2 and 3) but, as soon as the rotating core having revolved through a small angle in the direction of the arrow, attains the position shown in Fig. 4, the magnetic flux passes from polar expansion 2, across segment 11 to the polar expansion 15 of the armature core and through the same, to its polar expansion 13 and across segment 10 to polar expansion 3 (south) of the magnet.

Thus the armature core is crossed by a flux entering from polar expansion 15 and leaving at polar expansion 13.

Proceeding in the rotation to the position shown in Fig. 5, the magnetic flux through the armature-core falls to zero as it can go through from polar expansion 2 to polar expansion 3 directly, subdividing in two branch-fluxes offered by the rotating segments 10 and 11 and by the polar expansions 13 and 15 of the core of the armature, cross-ways.

Proceeding further in the rotation and coming to the position shown in Fig. 6 the magnetic flux passes from polar expansion 2 through segment 11 to polar expansion 13 and through the armature core, then from its other polar expansion 15 through segment 10 to polar expansion 3 (south) of the magnet. In this way the armature-core is crossed by a flux entering from polar expansion 13 and going out at polar expansion 15, that is in the opposite direction as previously shown.

Proceeding in its rotation, the rotating core after one half revolution comes in a position symmetric to the starting position (Fig. 2) in which however the rotating segment 10 assumes the position in which segment 11 was at the start and vice versa.

So in one half revolution two reversals of the magnetic flux are obtained in the core of the armature, i. e. two maximums of current in the winding and, proceeding further in the rotation for another half revolution, right to the starting position, two other maximums will be obtained, that is four in one revolution.

In case the machine should be used for the ignition of internal combustion engines, it will be, as usual, provided with two windings, one low-tension and one high-tension, and with a circuit-breaker on the primary or low-tension circuit, which will break the circuit at the moment the electromotive force goes through a maximum, thus obtaining the immediate increase in voltage in the secondary circuit and consequently the sparks in the sparking plugs of the engine as practiced with all ignition magnetos.

What I claim is:

1. A magneto electric machine comprising a fixed armature, a fixed magnet, fixed core ends for the armature extending into two polar expansions provided so that one of them lies above the axis of rotation of the machine, the other below the same axis, and both expansions being formed in their inside so as to form a cylindrical cavity, a revolving part rotating in the cavities whose magnetic core consists of two circular segments connected mechanically together but insulated magnetically one from another, a nonmagnetic shaft for the revolving part, the parts forming the armature, that is the core expansion and its polar expansions, lie in the vertical axial plane of the machine, the expansion uniting the core of the armature to its lower end, and being provided with a large aperture allowing the shaft to go therethrough.

2. A magneto electric machine comprising a fixed armature; a permanent magnet; a revolving part comprising a magnetic core consisting of two circular segments mechanically connected together and isolated magnetically one from the other; a nonmagnetic shaft for said revolving part; and a fixed core bearing the armature winding provided on the inside of the permanent magnet and connected to the pole-shoes of the armature by two prolongations, one of the pole-shoes extending from right to left, the other from left to right parallel to the axis of rotation of the revolving part, and one of these pole-shoes being placed relative to the axis of rotation, on the same side as the fixed core, while the other pole-shoe is diametrically opposite and joined with the core by one of the prolongations which is shaped in such a manner as to allow the passage of the shaft which bears the rotating magnetic parts.

In testimony whereof I affix my signature.

GINO MODIGLIANI.